March 31, 1925.
C. S. SMITH
1,531,824
METHOD OF MAKING ELECTRICALLY WELDED PIPE COUPLINGS
Filed Jan. 12, 1923
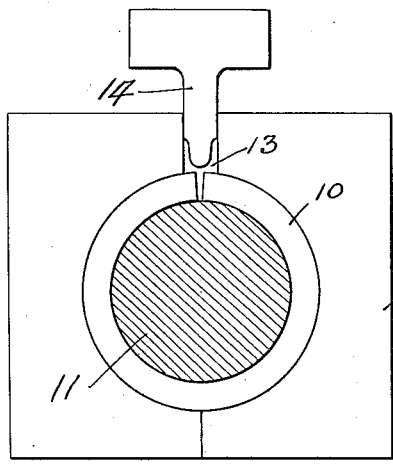
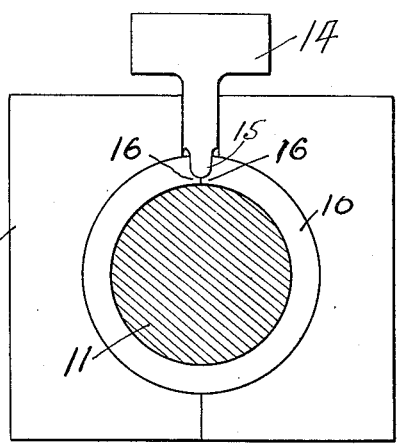
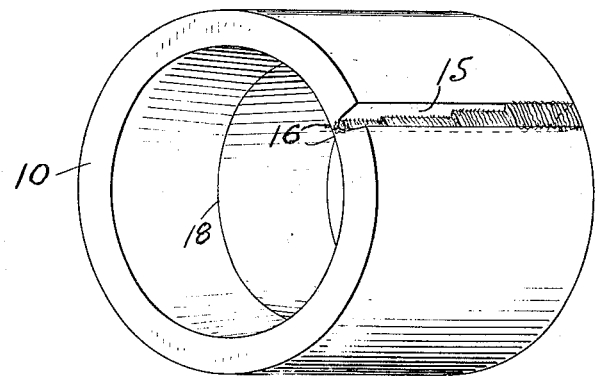
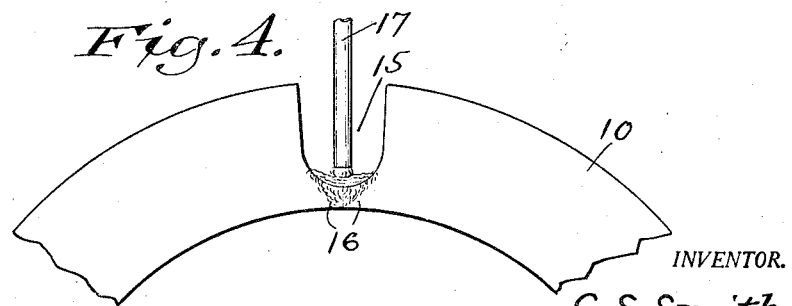
WITNESS
Fred Jahn
DEL.
INVENTOR.
C. S. Smith,
BY
Erwin, Wheeler & Woodard
ATTORNEYS.

Patented Mar. 31, 1925.

1,531,824

UNITED STATES PATENT OFFICE.

CHARLES S. SMITH, OF MILWAUKEE, WISCONSIN, ASSIGNOR TO A. O. SMITH CORPORATION, OF MILWAUKEE, WISCONSIN, A CORPORATION OF NEW YORK.

METHOD OF MAKING ELECTRICALLY-WELDED PIPE COUPLINGS.

Application filed January 12, 1923. Serial No. 612,265.

*To all whom it may concern:*

Be it known that I, CHARLES S. SMITH, a citizen of the United States, and a resident of the city of Milwaukee, county of Milwaukee, and State of Wisconsin, have invented certain new and useful Improvements in Methods of Making Electrically-Welded Pipe Couplings; and I do declare the following to be a clear, exact, and complete description thereof, such as will enable others skilled in the art to which my invention relates to use the same, reference being had to the accompanying drawing, as illustrative of a practicable construction in which my invention has been embodied.

The invention relates to the manufacture of electrically welded pipe couplings, and particularly to the formation of the welding groove at the meeting line of the ends of the blank out of which the coupling is formed. The blanks forming the couplings are shaped from metal plates of suitable dimensions, which are rolled into annular form with the ends of the plate in proximity or abutting relation. Couplings of this character are now generally welded at the meeting ends of the plate by means of an electric arc, and the welding may be satisfactorily performed, without providing a welding groove, where the gauge of the metal is not thick.

The present invention is particularly applicable to the manufacture of tubular pipe couplings of very heavy gauge, which are designed for use in connecting the threaded ends of pipes of large diameter, and which are subjected to severe strains. In order to fulfill their purposes, such couplings must be constituted necessarily of plate metal of a thickness which renders their complete welding somewhat difficult, in that the ordinary methods of butt and lap welding are not applicable. Such ordinary methods are ineffective, by reason of the depth which the heat is required to penetrate in order to produce in the abutting or over-lapping edges that state of fusion necessary to make a satisfactory union of the parts.

In making heavy couplings, heretofore, the excessive thickness of the metal has necessitated chamfering or cutting away the outer corners of the meeting ends of the annulus, to produce a longitudinal or axially extending exterior V-shaped groove into which the point of a weldrod could be introduced, with the idea of initiating the welding operation upon the thin edges of the metal forming the bottom of such groove, and so effect a more nearly complete fusion of the metal, the welded joint being built up from that point. By traversing the weldrod along the groove, the contiguous ends of the blank forming the coupling are fused, and successive layers of molten metal flowing from the weldrod, when a fusible one is employed, are deposited in the groove, until the latter is filled and the contour of the coupling is made regular.

The operations of cutting away the corners to form the V-welding groove, are both time consuming and expensive, and serve to retard in a material degree the output, where quantity production is desired. My invention, however, completely eliminates the delays attendant upon the older practices, and enables me to form a U-shaped welding groove in a most economical and expeditious manner, so that the production of finished couplings is greatly facilitated.

In carrying out my invention, I depart entirely from the older practices, and form the U-welding groove in a novel manner by depressing the metal in the regions adjacent the contiguous or meeting ends of the annulus, and so produce the desired thin edges at the bottom of the groove, upon which the arc may play to fuse such thin edges at the commencement of the welding operation. Such fusion having been effected, I continue the welding operation, as before, until the groove is entirely filled and the welded joint completed.

The U-welding groove is produced by a simple stamping operation, which eliminates the cost of cutting away the edges of the plates by milling, as heretofore. Such simplified operation consists in forming the groove by compression of the metal at the meeting edges of the plates by means of a die actuated by a powerful press. The said plan of producing the welding groove is peculiarly applicable to the formation of pipe couplings of heavy gauge, as in the instant case, and in which my present invention specifically resides.

The features embodied in my improvement will now be particularly described, and the novelty thereof pointed out in the appended claims.

In the drawing which accompanies this specification:

Figure 1 is an end view showing the active elements of a stamping press of simple construction which is employed in producing the U-welding groove in a heavy gauge pipe coupling, and showing the coupling blank as in position prior to the groove forming operation.

Fig. 2 shows the position of the same elements after a press operation to form the groove has taken place.

Fig. 3 is an angular view showing the several dimensions of a pipe coupling of heavy gauge metal, with the welding groove formed therein in the line of the meeting ends of the coupling blank, and showing also how the successive layers of molten metal flowing from the weldrod are deposited in the fusing operation to fill the groove and complete the welding of the coupling into an integral structure.

Fig. 4 is an enlarged end view of a portion of a coupling of heavy gauge, showing the welding groove formed in accordance with my invention and the commencement of the welding operation at the bottom of such groove.

In the manufacture of heavy pipe couplings, a metal blank section having a length proportionate to the diameter of the coupling which it is desired to produce, is cut from a plate of suitable width and thickness, and is rolled into the annular form shown in Fig. 1. Such annular coupling blank is indicated by the numeral 10, with its squared meeting ends in proximity, but preferably slightly spaced apart. The blank is closely fitted about a mandrel 11, and placed within the encircling matrix 12 of a power press. The said matrix 12 is properly positioned in fixed position in the press, and confines the tubular blank 10 against any radially expansive movement. By means of this arrangement of devices, distortion of the contour of the tubular form into which the coupling blank has been rolled, is resisted when radial pressure is applied exteriorly of the blank. The use of a mandrel which can be expanded interiorly of the annulus 10, will facilitate the operation.

Working in a slot 13 which extends radially of a circular opening in the matrix 12, is a punch or die 14 having an elongated face, carried by the movable member of the press, and adapted to exert external pressure upon the coupling blank. The contiguous ends of the coupling blank are brought into exact register or alignment with the punch 14, and power is applied to the latter, with the result shown in Fig. 2. In such movement of the punch 14, the metal of the ends of the blank is compressed and displaced so as to re-form the ends of the blank, with the result that a deep groove 15 of U-shape with substantially parallel sides, is formed longitudinally of the coupling blank at the meeting line of the ends thereof. In the operation of such compression, those portions of the metal in the area of the inner or lower edges of the ends of the blank are by extrusion caused to flow toward each other, so as to partially or even completely close the previously reserved open space and produce thin edges 16 at the bottom of the groove, which may be easily and completely fused by the arc at the commencement of the welding operation. In its completed form, the groove will have substantially the outline shown in Fig. 4.

The coupling is then carried to an arc welding machine, in which, by preference, a fusible weldrod 17 is employed to conduct the welding current to the work. The arc playing upon the thin edges 16, forming the bottom of the groove, readily fuses such edges, and at the same time the metal flowing from the weldrod is deposited in the groove. In the operation of traversing the weldrod laterally of the joint, the metal of the coupling at the sides of the groove is fused by the arc, and successive layers of welding metal flowing from the weldrod in the axial movements of the latter with respect to the coupling, are deposited in the groove in the manner indicated in Fig. 3, until the groove is entirely filled and the contour of the coupling restored. Complete fusion throughout the whole area of the welded joint is thus accomplished, and an integral structure of superior strength is produced. But instead of using a fusible weldrod to supply the welding metal required to fill the welding groove, I may lay short slugs or pieces of welding metal in the groove and fuse them and the contiguous ends of the coupling blank by an arcing current conducted by an ordinary electrode, and I may supplement the action of a fusible weldrod by the use of such additional welding material.

The simple and expeditious manner in which I form the welding groove in a tubular pipe coupling of heavy gauge, enables me to produce such couplings very economically. The sides of the groove 15 are substantially parallel as already stated, and this provision enables me to finish the welding operation, using but a minimum quantity of welding metal supplied by the weldrod. The arrangement of the spaced parallel side walls of the U-groove enables me to first completely fuse and weld the thin edges at the bottom thereof, and then fill the groove with a lessened consumption of welding material than is required to fill the wider V-groove, is a feature of my invention. The practice of my invention enables me to perfect a welded joint which extends entirely through and embraces the whole thickness of the metal forming the coupling, and this I do with a minimum expenditure of electric energy in effecting the necessary degree of fusion in the parts.

In the drawing, I have shown the formation of the U-groove 15 as somewhat exaggerated, but this showing is merely conventional, and is not truly proportionate. In forming the said groove, it is necessary only to separate the parallel or substantially parallel walls of the groove a distance which will enable the point of the electrode to closely approach the thin edges of the metal at the bottom of the groove, so that when the arc is struck complete fusion of such edges will be effected before the arc is allowed to play upon the metal at the sides of the groove. If the arc be permitted to play upon the walls of the groove before fusing the said thin edges, the weld may not extend entirely through the metal.

A circumferential ridge 18, may be formed interiorly of the coupling, and extend circumferentially thereof, which ridge conduces to the production of tapering openings which may be tapped to provide threads of uniform depth, with the cutting away of a minimum amount of metal. In making couplings of this type, the mandrel 11 will be divided transversely and entered at the opposite ends of the coupling blank.

Having thus described my invention, what I claim and desire to secure by Letters Patent of the United States, is:

1. The method of manufacturing electrically welded pipe couplings, which consists in forming a metal strip into an annulus with its meeting ends in proximity, applying pressure to the annulus in the meeting line of the said ends to compress the metal and form a welding groove, and fusing the metal in the area of the said groove to weld the coupling into an integral structure.

2. The method of manufacturing electrically welded pipe couplings, which consists in forming a metal strip into an annulus with its meeting ends in proximity, holding the annulus against radial expansion, applying pressure to the annulus in the meeting line of the said ends to compress the metal and form a welding groove, and fusing the metal in the area of the said groove to weld the coupling into an integral structure.

3. The method of manufacturing electrically welded pipe couplings, which consists in forming a metal strip into an annulus with its meeting ends in proximity, applying radial pressure to the annulus in the meeting line of the said ends to compress the metal and form a welding groove, and fusing the metal in the area of the said groove to weld the coupling into an integral structure.

4. The method of manufacturing electrically welded pipe couplings, which consists in forming a metal strip into an annulus with its meeting ends in proximity, holding the annulus against radial expansion, applying radial pressure to the annulus in the meeting line of the said ends to compress the metal and form a welding groove, and fusing the metal in the area of the said groove to weld the coupling into an integral structure.

5. The method of manufacturing electrically welded pipe couplings, which consists in forming a metal strip into an annulus with its meeting ends in proximity, applying pressure to the annulus in the meeting line of the said ends to compress the metal and form a welding groove, conducting an arcing current to fuse the metal in the area of the groove, and filling the groove with additional welding material to weld the couplings into an integral structure.

6. The method of manufacturing electrically welded pipe couplings, which consists in forming a metal strip into an annulus with its meeting ends in proximity, holding the annulus against radial expansion, applying pressure to the annulus in the meeting line of the said ends to compress the metal and form a welding groove, conducting an arcing current to fuse the metal in the area of the groove, and filling the groove with additional welding material to weld the coupling into an integral structure.

7. The method of manufacturing electrically welded pipe couplings, which consists in forming a metal strip into an annulus with its meeting ends in proximity, applying pressure to the annulus in the meeting line of the said ends to compress the metal and form a welding groove, conducting an arcing current by means of a fusible weldrod to fuse the metal in the area of the groove, and filling the groove with molten metal flowing from the weldrod to weld the coupling into an integral structure.

8. The method of manufacturing electrically welded pipe couplings, which consists in forming a metal strip into an annulus with its meeting ends in proximity, holding the annulus against radial expansion, applying pressure to the annulus in the meeting line of the said ends to compress the metal and form a welding groove, conducting an arcing current by means of a fusible weldrod to fuse the metal in the area of the groove, and filling the groove with molten metal flowing from the weldrod to weld the coupling into an integral structure.

9. The method of manufacturing electrically welded pipe couplings, which consists in forming a metal strip into an annulus with its meeting ends in proximity, holding the annulus against radial expansion, applying radial pressure to the annulus in the meeting line of the said ends to compress the metal and form a welding groove, conducting an arcing current by means of a fusible weldrod to fuse the metal in the area of the groove, and filling the groove with molten metal flowing from the weldrod to weld the coupling into an integral structure.

10. The method of manufacturing electrically welded pipe couplings, which consists in forming a metal strip into an annulus with its meeting ends slightly spaced apart, applying radial pressure to the annulus in the line of the meeting ends to compress the metal and form a welding groove and cause the metal at the ends to flow into contact at the bottom of the groove, and fusing the metal in the area of the said groove by means of an electric arc to weld the coupling into an integral structure.

11. The method of manufacturing electrically welded pipe couplings, which consists in forming a metal strip into an annulus with its meeting ends slightly spaced apart, applying radial pressure to the annulus in the line of the meeting ends to compress the metal and form a welding groove and cause the metal at the ends to flow into contact at the bottom of the groove, fusing the metal in the area of the groove by an arcing current conducted by a fusible weldrod, and filling the groove with molten metal flowing from the weldrod, to weld the coupling into an integral structure.

12. The method of manufacturing electrically welded pipe couplings, which consists in forming a metal strip into an annulus with its meeting ends in proximity and an interior ridge from which the openings flare, compressing the metal in the line of the meeting ends to form a welding groove, and fusing the metal in the area of the groove by means of an electric arc to weld the coupling into an integral structure 13. The process of electric arc welding, which consists in forming a welding groove at the meeting edges to be welded by compression of the metal thereat, fusing the metal in the area of the groove, and filling the groove with molten metal to form an integrally welded structure.

14. The process of electric arc welding, which consists in forming a welding groove at the meeting edges to be welded by compression of the metal thereat, fusing the metal in the area of the groove by an electric arc conducted by a fusible weldrod, and filling the groove with molten metal flowing from the fusible weldrod to form an integrally welded structure.

15. The process of electric arc welding, which consists in forming a welding groove in the line of the meeting edges to be welded by compression of the metal thereat, fusing the metal in the area of the groove by means of an electric arc, and filling the groove with molten welding material to form an integrally welded structure.

16. In electric arc welding, the process of forming a welding groove in thick metal parts to be welded, which consists in compressing the metal in the line of the meeting edges of the parts to form the groove and produce thin edges at the bottom of the groove, to enable the arc to play upon and fuse such thin edges at the commencement of the welding operation.

17. In electric arc welding, the process of forming a welding groove in thick metal parts to be welded, which consists in compressing the metal in the line of the meeting edges of the parts to form the groove and produce thin edges in abutting relation at the bottom of the groove, to enable the arc to play upon and fuse such thin edges at the commencement of the welding operation.

18. In electric arc welding, the process of forming a welding groove in thick metal parts to be welded, which consists in compressing the metal in the line of the meeting ends of the parts to form a groove with substantially parallel side walls and produce thin edges on the parts at the bottom of the groove, to enable the welding arc to fuse such thin edges at the commencement of the welding operation.

In testimony whereof, I have signed my name at Milwaukee, this 9th day of January, 1923.

C. S. SMITH.

Witnesses:
W. F. WOOLARD,
ELIZABETH MURRAY.